United States Patent
Yalamanchi

(10) Patent No.: US 8,566,909 B2
(45) Date of Patent: Oct. 22, 2013

(54) ROW-LEVEL SECURITY WITH EXPRESSION DATA TYPE

(75) Inventor: Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 12/012,258

(22) Filed: Feb. 1, 2008

(65) Prior Publication Data

US 2009/0199273 A1   Aug. 6, 2009

(51) Int. Cl.
*G06F 17/30* (2006.01)
*G06F 17/28* (2006.01)

(52) U.S. Cl.
USPC ............. 726/4; 715/781; 707/3; 707/9; 704/5

(58) Field of Classification Search
USPC .......................... 726/4; 705/713, 781; 715/781
See application file for complete search history.

(56) References Cited

U.S. PATENT DOCUMENTS

| | | | | |
|---|---|---|---|---|
| 5,418,950 A | * | 5/1995 | Li et al. | 715/781 |
| 6,487,552 B1 | * | 11/2002 | Lei et al. | 1/1 |
| 7,127,467 B2 | * | 10/2006 | Yalamanchi et al. | 1/1 |
| 2004/0044655 A1 | * | 3/2004 | Cotner et al. | 707/3 |
| 2005/0177570 A1 | * | 8/2005 | Dutta et al. | 707/9 |
| 2005/0289342 A1 | | 12/2005 | Needham et al. | |
| 2006/0041421 A1 | * | 2/2006 | Ta et al. | 704/5 |

* cited by examiner

*Primary Examiner* — Carl Colin
*Assistant Examiner* — S. Ali Zaidi
(74) *Attorney, Agent, or Firm* — Kraguljac Law Group LLC

(57) ABSTRACT

Systems, methods, and other embodiments associated with row level security for a database table are described. One example method includes detecting an access statement seeking access to a row in a database table for which row level security is active. The method includes adding a predicate to the access statement. The predicate is based on an access control expression associated with the row. The access control expression depends on an instance of an expression data type associated with the row. The method includes populating an attribute of the predicate, and controlling access to the row based on a computed value for the predicate.

28 Claims, 6 Drawing Sheets

ROW-LEVEL SECURITY WITH EXPRESSION DATA TYPE

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Database tables include rows and columns. It may be desired to control access to a database on a row by row basis. Conventionally, controlling row level access may have been implemented using labels (e.g., classification labels, sensitivity labels). A sensitivity label may have been assigned to an individual row in a database table. The label may have enabled row level security. The labels may have been stored in a dedicated column in the database table. Conventional labels were typically static items that identified a group or some other entity or characteristic upon which access was controlled. For example, a conventional label may have indicated that a user associated with a first group could access a row while a user associated with a second, different group could not. Similarly, a conventional label may have indicated a security level that a user had to meet or exceed before the user could access the row. For example, the label may have indicated a required security level of x, and a first user who had a security level of x or greater may have been allowed to access the row while a second user who had a security level less than x may not have been allowed to access the row. While inclusive traits (e.g., group membership) and quantifiable traits (e.g., security level) are described, it is to be appreciated that labels may have addressed other attributes.

Conventional systems may have compared user attributes to required attributes stored in the label associated with the row to be accessed in the dedicated column in the table that the user was attempting to access. The user attributes may have been accessible from a user label and/or session label. These labels define user attributes. In the example above, the labels may have provided values for security level and group membership. While two attributes are defined, it is to be appreciated that a user label and/or session label may include other, different attributes. However, this was one issue with label based security systems. Both the creator of the table and the user of the table needed to conform to the same fixed language concerning security. Thus, label based security tended to be limited in terms of dynamically responding to changing situations and to handling complex security considerations.

Some conventional systems extended the label approach into the virtual private database (VPD) domain. A VPD facilitates binding a stored procedure to a database object like a table, a view, and so on. A VPD object may be accessed using access statements including, for example, query statements, data manipulation operation (DMO) statements, and so on. When the VPD object was accessed, the accessing statement may have been intercepted and a stored procedure associated with the database object may have been executed. The stored procedure may have rewritten the accessing statement to achieve different ends including, for example, improving efficiency, improving security, and so on. Rewriting the accessing statement may have included inserting a dynamically generated clause to the access statement. The dynamically generated clause may have included variables available from the accessing environment. For example, variables associated with the user label, the session label, the machine, and so on, may have been present in the dynamically generated clause.

The dynamically generated clause may have been, for example, a "where" (e.g., SQL WHERE) clause. More generally, the generated clause may be treated as a "predicate". Thus, row level security may be enhanced in these conventional systems by rewriting an access statement to include a predicate (e.g., WHERE clause) that must be evaluated in a certain way before access to a row will be granted. While useful, this conventional approach still had limitations. For example, the exact nature of the relationship between the user accessing the data and the data itself needed to be defined ahead of time by a database administrator (DBA), an application developer, or other individual. Imperfect knowledge about security policies may have existed. Therefore, it may have been difficult, if possible at all, to pre-design a static system to handle a wide and/or complete spectrum of access policies. Thus, improvements to row level security are still desirable.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
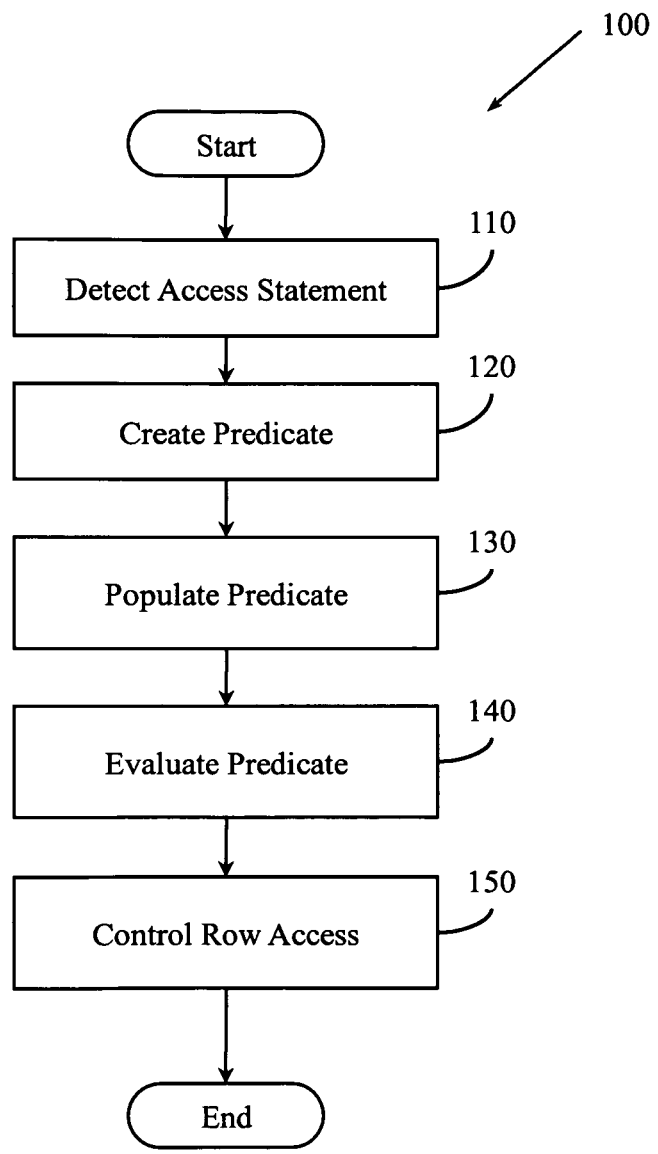
FIG. 1 illustrates an example method associated with row-level security that employs an expression data type.

Example systems and methods described herein concern row-level security that employs an expression data type. In one example, the expression data type may be the EXPRESSION data type provided in Oracle® Database systems. In one example, the EXPRESSION data type is a virtual data type that is created by placing a constraint on a VARCHAR2 column in a user table that stores expressions. The EXPRESSION data type may be processed using an EVALUATE operator. One skilled in the art will recognize the EVALUATE operator as an operator that evaluates expressions for data items.

Example systems and methods are tasked with including a row in the result set of a user operation (e.g., query, DMO) if and only if a conditional expression (e.g., predicate) added to the user operation by a stored security policy evaluates to a desired value (e.g., TRUE) when evaluated in light of the user/session profile of entity accessing the row. Unlike conventional systems that employ static labels, example systems and methods may employ an expression at the row level to provide security. The expression may be embodied in an instance of an expression data type. Thus, example systems and methods define row-level access control policies using an expression data type.

A database table may include a number of rows and columns. An expression column may be added to a table. The expression column may hold instances of an expression data type. For example, the expression column may hold one instance per row in the table. Instances of the expression data type may be evaluated to control access to corresponding rows. Thus, the additional column may be viewed as storing access policies. An access policy may be implemented as a conditional expression that may be referred to as an access control statement or access control expression. The conditional expression may have a set of predicates that are joined by a set of operators. The predicates may be expressed, for example, in SQL WHERE clause format. Therefore, the expression may use SQL operators including, for example, BETWEEN (e.g., range), IN (e.g., list), LIKE, and so on, in its predicate(s). When an expression includes two or more predicates, the predicates may be related (e.g., joined) by conjunctions (e.g., AND), disjunctions (e.g., or), and so on. In one example, an expression may also include an approved list of user-defined functions in its functions.

Example systems and methods support row level security using an expression data type. Different rows in a table may have different expressions that control row access. The expressions are to be used to control access to a row in light of the attributes of the entity trying to access the row. Thus, a user may acquire access to a row if the user's profile makes the expression evaluate to a desired value (e.g., TRUE). Since different rows may have different expressions, in one example, different rows in a table may have different access policies. In one example, each row in a table could have its own unique access policy.

An expression may have access to a set of attributes associated with a user (e.g., user profile, session profile). An expression may also have access to a set of attributes associated with an environment (e.g., computer identifier, IP address, time of day). An expression may also have access to a set of attributes associated with an access statement (e.g., query identifier, DMO identifier, operation type). For example, a DMO may be identified by an opcode that identifies whether the DMO is an update, delete, and so on. Therefore, complex security that addresses different attributes may be implemented. For example, access may be granted based on user attributes, environment attributes, and/or access attributes. Access may only be granted to a row if a conditional expression that considers all these attributes evaluates to a desired value (e.g., TRUE).

An expression may be crafted in light of a vocabulary. In one example, the vocabulary may be user-defined and/or application specific. A DBA, security administrator, application developer, and so on, may define a vocabulary for an access control policy. The access control policy may be application specific and thus the vocabulary may be application specific. The access control policy may be unique for each table for which row level security is applied. The access control policy need not be limited to conventional label type characteristics (e.g., level, compartment, group). An access control policy may have different attributes, including, for example, both simple attributes (e.g., NUMBER, DATE, VARCHAR) and complex attributes (e.g., XMLType, SPATIAL, TEXT). One skilled in the art will recognize terms like NUMBER, XMLType, and so on, as referring to data types available in a relational database. When a vocabulary includes an XMLtype attribute, then a corresponding predicate in an access control expression may use the EXISTSNODE operator. One skilled in the art will recognize EXISTSNODE as an XML operator that matches an XML Document with an XPath expression with predicates on the contents of the document. While EXISTSNODE is described, it is to be appreciated that other XML operators may also be employed. Since environment and/or statement contexts may be accessible to a security policy, a security policy may be dynamic. For example, a security policy may change based on time of day, on accessing computer, on load, and so on. More generally, an access control expression may have different results based on the value of dynamic values available to the expression.

An access control policy may be associated with a table to enable expression data type row level security for the table. In one example, associating the access control policy with the table may initiate creation of the expression column in the database table. Recall that the expression column can store instances of an EXPRESSION data type. Associating the access control policy with the table may also establish the access control vocabulary as the metadata for formulating access control expressions.

An access control policy may be processed when an access statement seeks access to a row. Before access is granted, attributes in an access control expression may be initialized with values taken from the user, environment, and/or statement contexts. The attributes in the access control expression may be processed in accordance with the access control vocabulary defined by a security policy. To determine whether to grant access, the instance of the EXPRESSION data type associated with the row to be accessed may be evaluated. Thus, the security policy may return a predicate having an EVALUATE operator. One skilled in the art will recognize the EVALUATE operator as an operator that evaluates expressions for data items. The EVALUATE operator operates on the instance of the EXPRESSION data type associated with the row being accessed. The EVALUATE operator computes the result of the predicate in light of the initialized values for the attributes in the access control expression. Access to the row is then selectively granted or denied based on the computed result.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.

PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions, and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to, hardware, firmware, software in execution on a machine, and/or combinations of each to perform a function(s) or an action(s), and/or to cause a function or action from another logic, method, and/or system. Logic may include a software controlled microprocessor, a discreet logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored source-level instructions being claimed as stored source-level instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with row-level security based on an expression data type. Method 100 may include, at 110, detecting an access statement that seeks access to a row in a database table for which row level security is active. The access statement may be, for example, a query, a data manipulation operation (DMO), and so on. Detecting the access statement may include receiving a signal from a virtual private database (VPD), monitoring a query reader, and so on.

Method 100 may also include, at 120, creating a predicate for the access statement. The predicate will depend, at least in part, on an access control expression associated with the row. The access control expression will itself depend, at least in part, on an instance of an expression data type associated with the row. In one example, the predicate is an SQL WHERE clause. The predicate may include various functions. For example, the predicate may include a user defined function, a system defined function, and so on.

Method 100 may also include, at 130, populating an attribute of the predicate. The attribute may be populated with a value acquired from a context associated with the entity that provided the access statement. The context may be, for example, a user environment profile, a session profile, and so on. The value may also be populated with a value associated with an environment from which the access statement was provided. For example, the access statement may have come from a computer having a certain IP address, or located in a certain time zone. The value may also be populated with a value associated with the access statement itself. For example, the access statement may have an opcode that identifies whether the access statement is an update or a delete or so on.

Method 100 may also include, at 140, evaluating the predicate. Evaluating the predicate may include, for example, computing a value for the predicate. The value may be computed in light of the attribute values populated from the various contexts described above. It may be desired to have the predicate yield a single value. For example, a logical TRUE or logical FALSE result may facilitate determining whether to provide access to the row. Therefore, in one example, the predicate may be inserted into an EVALUATE operator that can be resolved to a single logical value.

Method 100 may also include, at 150, selectively providing access to the row associated with the access statement detected at 110. Whether access is granted to the row will depend, at least in part, on the predicate value. In one example, granting access to the row includes providing row content as a row result to the access statement. For example, if the access statement was a query, then row content may be provided as a query result.

While FIG. 1 illustrates various actions occurring in serial, it is to be appreciated that various actions illustrated in FIG. 1 could occur substantially in parallel. By way of illustration, a first process could detect access statements, a second process could create and populate predicates, and a third process could evaluate predicates and control row access. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with the method 100 are described as being stored on a computer-readable medium, it is to be appreciated that executable instructions associated with other example methods described herein may also be stored on a computer-readable medium.

Figure 2:
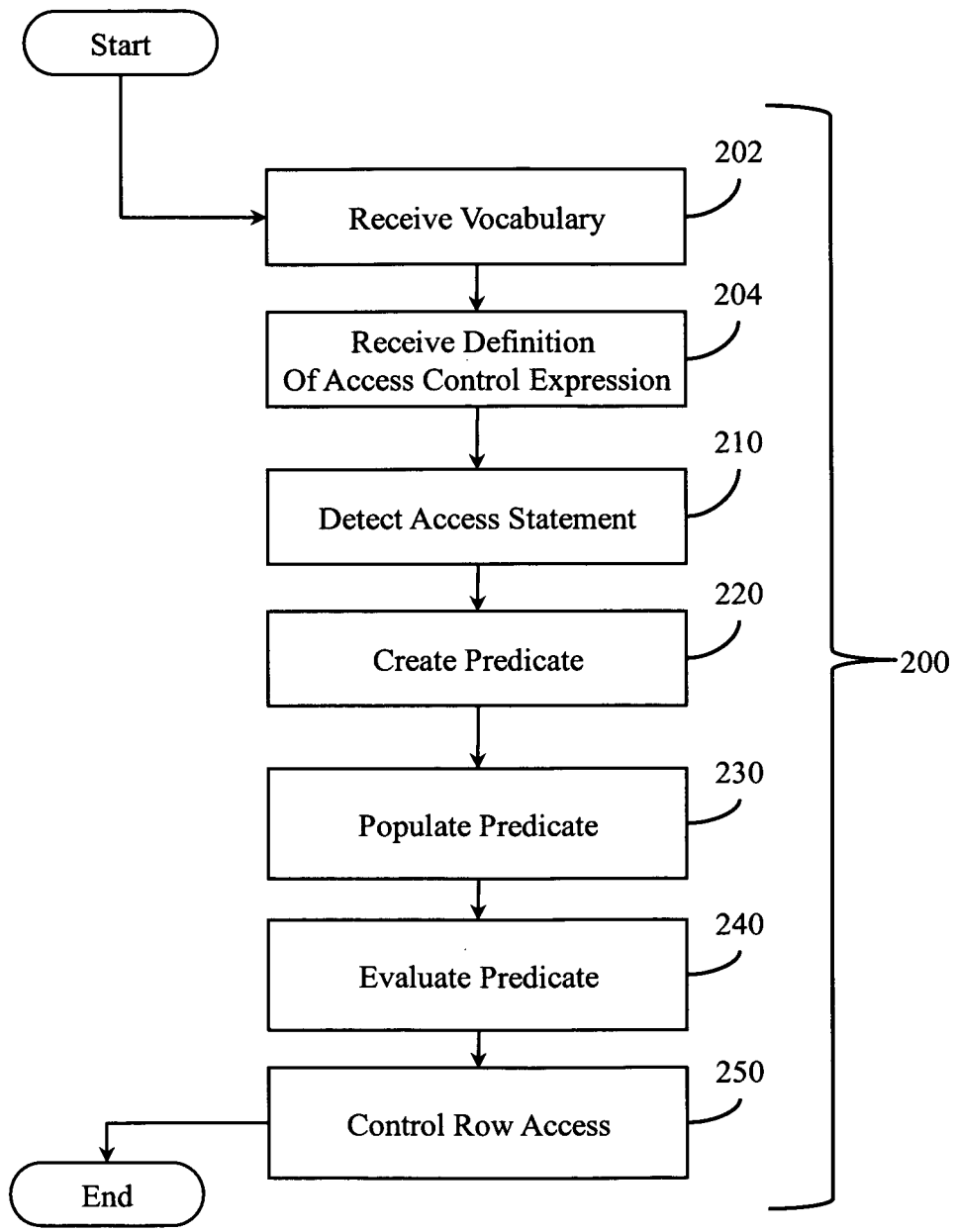
FIG. 2 illustrates another example method associated with row-level security that employs an expression data type.

FIG. 2 illustrates a method 200 associated with row-level security based on an expression data type. Method 200 includes some actions similar to those described in connection with method 100. For example, method 200 includes detecting an access statement at 210, creating a predicate at 220, populating the predicate at 230, evaluating the predicate at 240, and controlling row access at 250. However, method 200 may include actions performed before these actions.

For example, method 200 may include, at 202, receiving a vocabulary associated with an access control policy for the database table for which row level security is active. The vocabulary may be, for example, user-defined and application specific. Thus, row level security supported by method 200 is not limited to a pre-defined set of labels.

The vocabulary may be used to define access control expressions, and access control policies. Thus, the vocabulary may facilitate establishing metadata associated with creating access control expressions, and access control policies. In one example, the vocabulary may be communicated using XML. In one example, the vocabulary may include an attribute having a simple data type. In another example, the vocabulary may include an attribute having a complex data type. Combinations of simple and complex data types may be found in some examples. The vocabulary may include data that describes dynamic elements. For example, the vocabulary may include data that describes how an attribute can be configured to accept a time of day value, a location value, and so on. Thus, row control may be dynamic based on factors like the time of day when a row is accessed, from where the access statement is received, and so on.

Method 200 may also include, at 204, receiving a definition of an access control expression for a row in the database table for which row level security is active. The access control expression may be parsed to insure that it conforms to the vocabulary received at 202. The access control expression may then be stored in a row in the database table to control access to the row.

Figure 3:
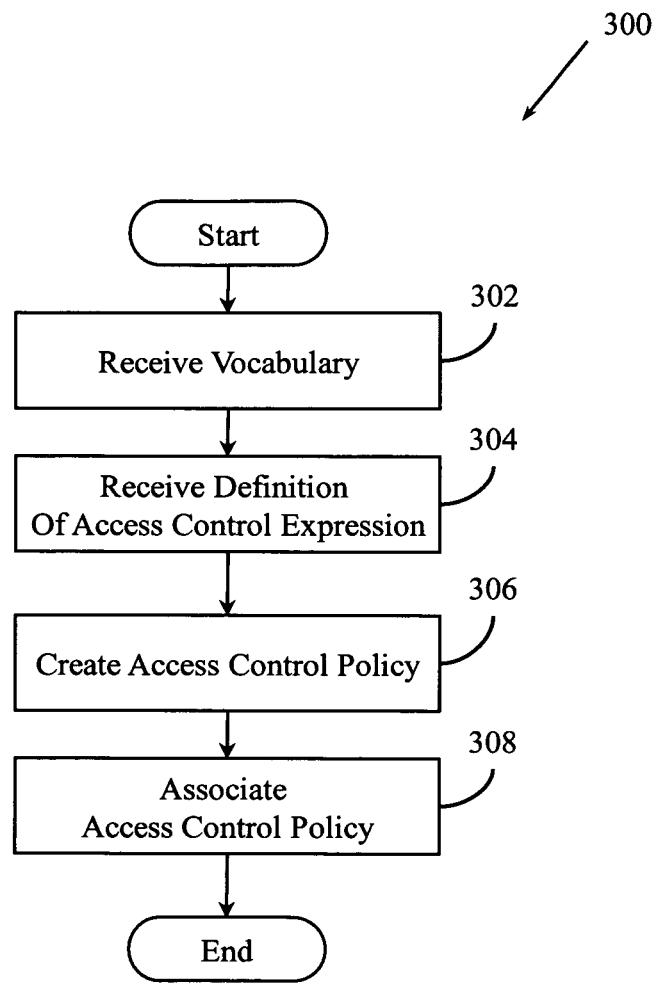
FIG. 3 illustrates another example method associated with row-level security that employs an expression data type.

FIG. 3 illustrates a method 300 associated with row-level security based on an expression data type. Method 300 includes some actions similar to those described in connection with method 200. For example, method 300 includes receiving a vocabulary at 302 and receiving a definition of an access control expression at 304. However, method 300 may include additional actions.

For example, method 300 may include, at 306, creating an access control policy for the database table for which row level security is active. The access control policy may define row level security for rows in the database table. Row level security is to be controlled, at least in part, by access control expressions associated with rows. Different rows may be associated with different expressions and thus may have individualized row level security. In one example, a first row in the database table may have a first row level security defined by a first access control expression in the access control policy and a second, different row in the database table may have a second, different row level security defined by a second, different access control expression in the access control policy. In one example, each row may have its own access control expression.

Method 300 may include, at 308, associating the access control policy with the database table for which row level security is active. This may include, for example, establishing an expression column in the database table and then populating the expression column with an access control expression for a row for which row level security is to be provided. Recall that access control expressions are to conform with the vocabulary received at 302. Recall also that access control expressions may be populated at access time with values retrieved from an environment(s) associated with the access. Therefore, associating the access control policy with the database table may include establishing the vocabulary as metadata available for processing attributes of access control expressions.

The expression column may be configured to store a particular data type. For example, the expression column may store instances of the EXPRESSION data type. In one example, an instance of the EXPRESSION data type may be encapsulated in an EVALUATE operator.

Figure 4:
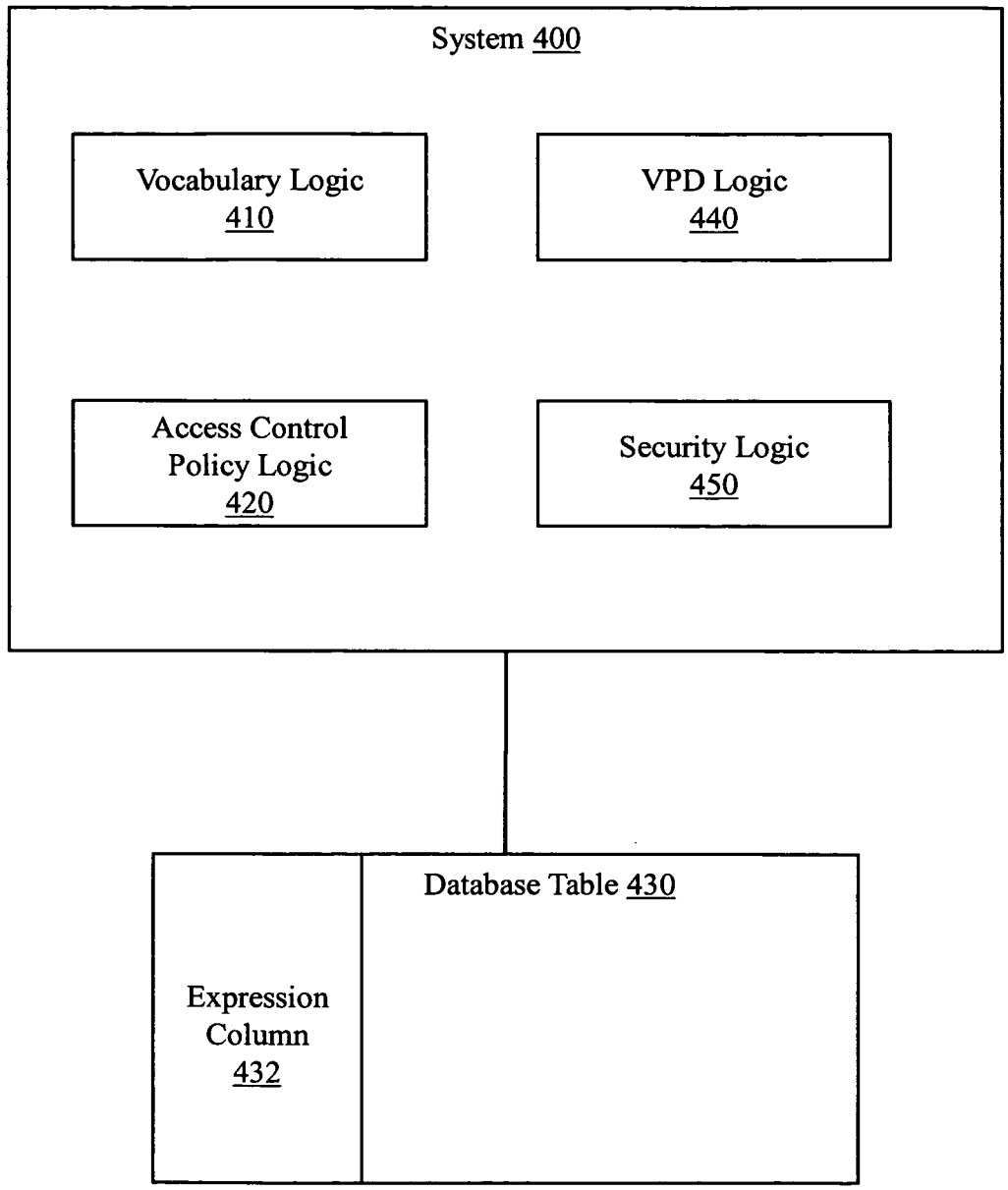
FIG. 4 illustrates an example system associated with row-level security that employs an expression data type.

FIG. 4 illustrates a system 400 that provides row-level security based on an expression data type. System 400 includes a vocabulary logic 410. Vocabulary logic 410 is to establish a set of metadata associated with a set of attributes that are candidates for membership in a row level access control expression. In one example, the metadata may be established as a set of attributes and values recorded in an XML document. In another example, the metadata may be established as attributes and/or values in a relational database table. The row level access control expression will protect a row in database table 420. The row level access control expression is to be stored in an expression column 432 in database table 430. In one example, the vocabulary logic 410 is to establish the set of metadata in accordance with user-defined, application specific semantics. For example, an accounts receivable application may have a first set of security semantics relevant to an accounting department while a parts database may have a second set of security semantics relevant to a manufacturing environment. Rather than constrain the two dissimilar entities to implement row level security using a fixed set of labels, each entity may define a security vocabulary that is then used for producing, populating, and evaluating access control statements associated with providing row level security. In one example, the vocabulary logic 410 is to establish the set of metadata in accordance with SQL operators and data types.

System 400 includes an access control policy logic 420. Access control policy logic 420 is to establish row level access control expressions that get associated with rows in database table 430. The access control policy logic 420 is to establish and populate the expression column 432 in the database table 430. In one example, entries placed in the expression column 432 by access control policy logic 420 are instances of an EXPRESSION data type. An instance will depend, at least in part, on a row level access control expression that conforms with the set of metadata established by the vocabulary logic 410.

System 400 includes a virtual private database (VPD) logic 440. VPD logic 440 is to intercept an access statement directed at a row in the database table 430. Rather than just let the access statement have unfettered access to the row, VPD logic 440 is to produce a condition that must be satisfied before access is granted. The condition may be coded into a predicate that is added to the access statement. In one example, the predicate is based on the instance of the EXPRESSION data type associated with the row in the database table 430. In one example, the VPD logic 440 is to place the predicate in an EVALUATE operator.

System 400 includes a security logic 450 to determine a value for the predicate produced by VPD logic 440. Security logic 450 will only selectively return a row content in response to the access statement based on the value for the predicate. The predicate includes attributes that conform to the vocabulary established by vocabulary logic 410. The attributes may be populated with values retrieved from a context associated with the access statement. These contexts may include, for example, a user profile, a session profile, a computational environment, and an access statement context.

Figure 5:
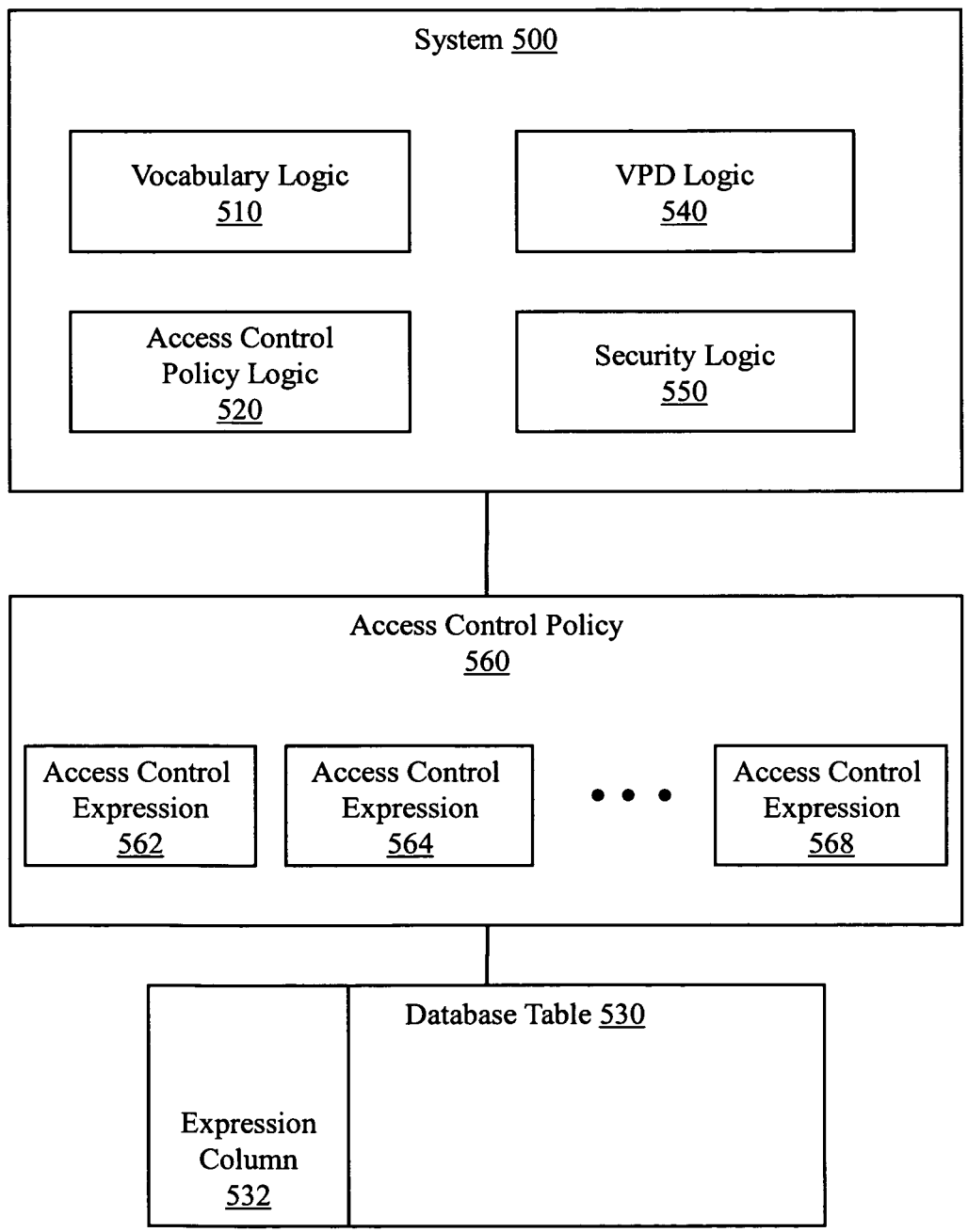
FIG. 5 illustrates another example system associated with row-level security that employs an expression data type.

FIG. 5 illustrates a system 500 that provides row-level security based on an expression data type. System 500 includes some elements similar to system 400 (FIG. 4). For example, system 500 includes a vocabulary logic 510, an access control policy logic 520, a VPD logic 540, and a security logic 550 that provide row level security for a database table 530 by storing access control expressions an expression column 532.

In one example, the access control policy logic 520 is to receive a definition of an access control expression for a row in the database table 530. The access control expression is to conform to the set of metadata established by the vocabulary logic 510. Access control expressions may be grouped together to facilitate providing row level security for database table 530. Thus, in one example, the access control policy logic 520 is to create an access control policy 560 for the database table 530. The access control policy 560 may contain a set of access control expressions (e.g., access control expression 562, and access control expressions 564 through 568). At different points in time and/or from different points of view the access control policy 560 may or may not be associated with database table 530. Thus, in one example, row level security may be switched on/off by controlling whether access control expressions in access control policy 560 are associated with database table 530.

As described above, access control policy 560 may include a set of access control statements. Therefore, a first row in the database table 530 may have a first row level security defined by a first access control expression (e.g., 562) in the access control policy 560 while a second, different row in the database table 530 may have a second, different row level security defined by a second, different access control expression (e.g., 564) in the access control policy 560. While a single access control policy 560 is illustrated, it is to be appreciated that system 500 may produce different access control policies. Therefore, database table 530 may be associated with different access control policies under different conditions. For example, a first access control policy may be associated with database table 530 when access statements are generated by a low level manager while a second access control policy may be associated with database table 530 when access statements are generated by an executive. Different access control expressions in access control policy 560 may be placed in expression column 532 in database table 530. A single access control expression (e.g., 562) may be placed in a set of entries in expression column 4532. For example, a single access control expression (e.g., 562) may be placed in all the entries in expression column 532. However, in a different example, a different access control expression may be placed in each entry in expression column 532.

Figure 6:
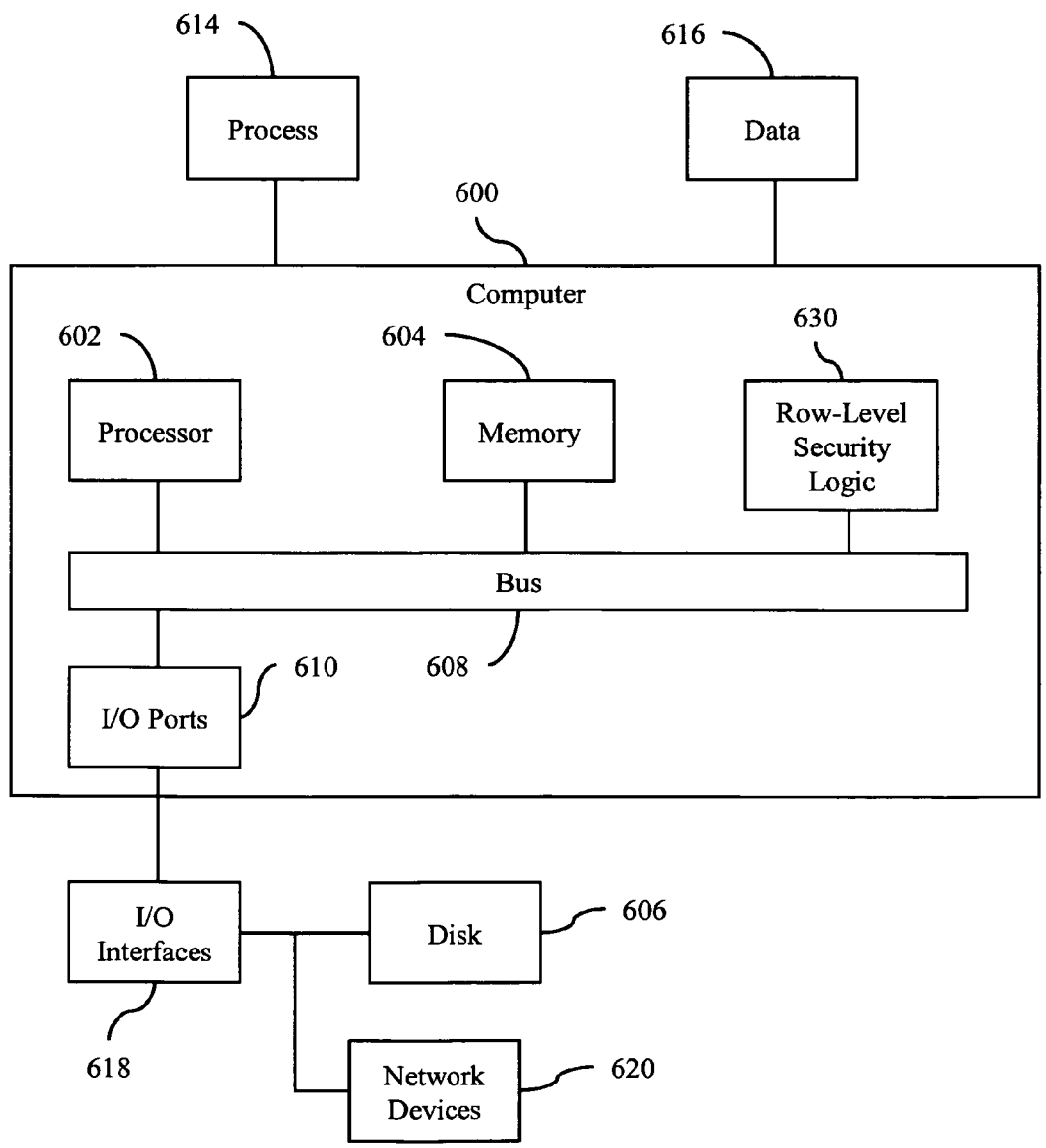
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a row level security logic 630 to provide row level security for rows in a database table. The row level security may be provided by storing access control statements in an expression column in the database table to be protected. The access control statements may be instances of an expression data type (e.g., EXPRESSION data type) encapsulated in an EVALUATE operator. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software in execution, firmware) for intercepting an access statement to a row in a database. In one example, the access statement may be intercepted by a query logic tasked with querying a table while in another example the access statement may be intercepted by a rewrite logic tasked with taking an input access statement and producing an output access statement that conforms to a rewrite doctrine (e.g., efficiency). Logic 630 may also include means (e.g., hardware, software in execution, firmware) for manipulating the access statement to include a predicate. The predicate may be constrained to include attributes defined in accordance with a security vocabulary. Logic 630 may also include means (e.g., hardware, software in execution, firmware) for populating the predicate from a context associated with the access statement. Logic 630 may also include means (e.g., hardware, software in execution, firmware) for controlling access to the row based on an evaluation of the predicate as populated. In one example, the logic 630 may be implemented as an ASIC programmed to perform all and/or portions of method 100 (FIG. 1), method 200 (FIG. 2), and/or method 300 (FIG. 3).

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
    detecting a first access statement that seeks access to a first row in a database table for which row level security is active;
    detecting a second access statement that seeks access to a second row in the database table for which row level security is active;
    identifying a first access control expression stored in the first row, where the first access control expression is a first predicate embodied as a first instance of an expression data type that conforms to a vocabulary;
    evaluating the identified first access control expression;
    identifying a second access control expression stored in the second row, where the second access control expression is a second predicate embodied as a second instance of the expression data type that conforms to the vocabulary;
    evaluating the identified second access control expression; and
    selectively executing the first and second access statements based, at least in part, on a result of the evaluating of the first and second access control expressions.

2. The non-transitory computer-readable medium of claim 1, where the computer-executable instructions for selectively executing the first access statement include providing a first row content as a row result to the first access statement if the first access statement evaluates to true.

3. The non-transitory computer-readable medium of claim 1, where the computer-executable instructions include receiving the vocabulary associated with at least one access control policy for the database table for which row level security is active.

4. The non-transitory computer-readable medium of claim 3, where the vocabulary is user-defined and application specific.

5. The non-transitory computer-readable medium of claim 3, where the computer-executable instructions include receiving a definition of the first access control expression for the first row in the database table for which row level security is active.

6. The non-transitory computer-readable medium of claim 5, where the first access control expression includes a dynamic element.

7. The non-transitory computer-readable medium of claim 5, where the computer-executable instructions include storing the first access control expression and the second access control expression in a column of the database table according to the at least one access control policy for the database table for which row level security is active, where the access control policy defines row level security for the first row and the second row in the database table, and where the row level security is controlled, at least in part, by an access control expression stored in that row.

8. The non-transitory computer-readable medium of claim 3, where the computer-executable instructions include associating an access control policy with the database table by establishing an expression column in the database table, populating the expression column with an access control expression for a row for which row level security is to be provided, and establishing the vocabulary as metadata available for processing attributes of access control expressions.

9. The non-transitory computer-readable medium of claim 8, where the expression column stores an instance of the EXPRESSION data type and where the computer-executable instructions include indexing elements of the expression column, where indexing elements of the expression column includes indexing expressions stored in the expression column to facilitate processing with the EVALUATE operator.

10. The non-transitory computer-readable medium of claim 1, where the computer-executable instructions include evaluating the first access control expression on one of a context associated with the entity that provided the first access statement, an environment from which the first access statement was provided, and a context associated with the first access statement.

11. A system, comprising:
a memory;
a processor;
an interface that connects the memory, the processor, and a set of logics, the set of logics comprising:
an access control policy logic configured to populate rows in an expression column in a database table with respective individual access control expressions for respective individual rows;
a virtual private database (VPD) logic configured to intercept an access statement directed at a row in the database table and to identify the individual access control expression in the individual row, where the individual access control expression is a predicate embodied as an instance of an expression data type that conforms to a vocabulary; and a security logic configured to evaluate the individual access control expression and to selectively return a row content in response to the individual access statement based on the evaluating of the individual access control expression.

12. The system of claim 11, further comprising a vocabulary logic to establish a set of metadata associated with a set of attributes that are candidates for membership in the individual access control expression and where the vocabulary logic is to establish the set of metadata in accordance with user-defined, application specific semantics.

13. The system of claim 11, further comprising a vocabulary logic to establish a set of metadata associated with a set of attributes that are candidates for membership in the individual access control expression and where the vocabulary logic is to establish the set of metadata in accordance with SQL operators and data types.

14. The system of claim 11, where the access control policy logic is configured to receive a definition of the individual access control expression for the individual row in the database table, where the individual access control expression conforms to the set of metadata; and where the individual access control policy logic is configured to create an access control policy for the database table based, at least in part, on the definition of the individual access control expression.

15. The system of claim 14, where a first row in the database table has a first row level security defined by a first access control expression stored in the first row, and where a second, different row in the database table has a second, different row level security defined by a second, different access control expression stored in the second row.

16. A computer-implemented method, comprising:
storing an access control expression in a row, the access control expression having a set of predicates that are joined by a set of operators, where a predicate is embodied as an instance of an expression data type that conforms to a vocabulary;
receiving an access statement against a database table;
accessing the row retrieved by the access statement to identify the access control expression stored in the row;
evaluating the set of predicates on a context of the access statement; and
granting access to the row when the set of predicates evaluates to a predetermined value.

17. The computer implemented method of claim 16, where the access control expression depends, at least in part, on an instance of an expression data type associated with the row.

18. The computer implemented method of claim 16, including creating an access control policy for the database table, where the access control policy defines the row level security for a row in the database table, and where the row level security is controlled, at least in part, by the access control expression.

19. The computer implemented method of claim 18, including receiving a vocabulary associated with the access control policy for the database table for which row level security is active; and where the access control policy creates an access control policy for the database table based, at least in part, on the definition of the access control expression.

20. The computer implemented method of claim 19, where the vocabulary establishes a set of metadata associated with a set of attributes that are candidates for membership in a row level access control expression.

21. The computer implemented method of claim 16, where a first row in the database table has a first row level security defined by a first access control expression stored in the first row, and where a second row in the database table has a second row level security defined by a second access control expression stored in the second row.

22. The computer implemented method of claim 21, including associating the access control policy with the database table for which row level security is active.

23. The computer implemented method of claim 22, where associating the access control policy with the database table includes establishing an expression column in the database table, populating the expression column with an access control expression for a row for which row level security is to be provided, and establishing the vocabulary as metadata available for processing attributes of access control expressions.

24. The computer implemented method of claim 16, where the access statement is one of a query and a data manipulation operation, and where the predicate is an SQL WHERE clause.

25. A non-transitory computer-readable medium storing computer-executable instructions that when executed by a computer cause the computer to perform a method, the method comprising:
   detecting a query that seeks access to data stored in a table for which row level security is active;
   retrieving a first row and a second row from the table in response to executing the query; and
   selectively returning the first row and the second row as a query result, based at least in part, on evaluating a first access control expression and a second access control expression;
   where the first access control expression is stored in the first row and the second access control expression is stored in the second row; and
   where the first access control expression is a first predicate embodied as a first instance of an expression data type that conforms to a vocabulary and the second access control expression is a second predicate embodied as a second instance of an expression data type that conforms to the vocabulary.

26. The non-transitory computer-readable medium of claim 25, where the first row is returned as the query result when the first access control expression evaluates to true.

27. The non-transitory computer-readable medium of claim 25, where the query contains an attribute, and where the vocabulary defines how to configure the attribute.

28. The non-transitory computer-readable medium of claim 27, where the attribute comprises information about a user or information about an environment.

* * * * *

UNITED STATES PATENT AND TRADEMARK OFFICE
CERTIFICATE OF CORRECTION

| | | |
|---|---|---|
| PATENT NO. | : 8,566,909 B2 | Page 1 of 1 |
| APPLICATION NO. | : 12/012258 | |
| DATED | : October 22, 2013 | |
| INVENTOR(S) | : Yalamanchi | |

It is certified that error appears in the above-identified patent and that said Letters Patent is hereby corrected as shown below:

In the Specification

In column 10, line 51, delete "4532." and insert -- 532. --, therefor.

Signed and Sealed this
Third Day of June, 2014

Michelle K. Lee
*Deputy Director of the United States Patent and Trademark Office*